United States Patent
Arima et al.

(10) Patent No.: US 6,836,652 B2
(45) Date of Patent: Dec. 28, 2004

(54) CONTRACT SYSTEM AND COMMUNICATION METHOD FOR CELLULAR PHONE

(75) Inventors: Keiko Arima, Tokyo (JP); Toyonori Ashihara, Tokyo (JP)

(73) Assignee: NEC Corporation, Tokyo (JP)

(*) Notice: Subject to any disclaimer, the term of this patent is extended or adjusted under 35 U.S.C. 154(b) by 181 days.

(21) Appl. No.: 10/316,843

(22) Filed: Dec. 12, 2002

(65) Prior Publication Data

US 2003/0119479 A1 Jun. 26, 2003

(30) Foreign Application Priority Data

Dec. 21, 2001 (JP) .................................... 2001-389735

(51) Int. Cl.[7] .............................................. H04M 11/00
(52) U.S. Cl. ...................................................... 455/407
(58) Field of Search .................................. 455/406, 407, 455/408, 414.1, 414.3, 550.1, 551; 379/121.03, 130, 144.06, 201.01, 201.02, 201.07, 201.08, 201.12

(56) References Cited

U.S. PATENT DOCUMENTS

| | | | |
|---|---|---|---|
| 6,167,251 A | * 12/2000 | Segal et al. | .................. 455/406 |
| 6,185,289 B1 | * 2/2001 | Hetz et al. | .............. 379/221.08 |
| 6,430,276 B1 | * 8/2002 | Bouvier et al. | ......... 379/121.01 |
| 6,636,590 B1 | * 10/2003 | Jacob et al. | ............ 379/114.05 |
| 2001/0024180 A1 | 9/2001 | Lee et al. | |

FOREIGN PATENT DOCUMENTS

| | | |
|---|---|---|
| JP | 07-203084 | 8/1995 |
| JP | 07-327096 | 12/1995 |
| JP | 08-186859 | 7/1996 |
| JP | 09-307666 | 11/1997 |
| JP | 11-341548 | 12/1999 |
| JP | 2001-168952 | 6/2001 |
| JP | 2001-188510 | 7/2001 |
| JP | 2001-258074 | 9/2001 |

* cited by examiner

*Primary Examiner*—Binh Tieu
(74) *Attorney, Agent, or Firm*—Foley & Lardner LLP

(57) ABSTRACT

According to the present invention, multiple contract sets, which are selectable by the user of the cellular phone and which each include a phone number, an available service, a payment method and a payer as contract clauses, are registered in the single cellular phone as contracts for the respective multiple phone numbers; and the cellular phone communication system manages communications for every contract sets according to the contract clauses defined in the respective contract sets and charges rates separately for the respective contract sets.

10 Claims, 3 Drawing Sheets

| Phone number : xxxxxxxx |
| E-mail address : XXXXXXXX |
| Web browsing service : Available |
| Payer : Individual |
| Payment method : Paid from individual's bank account |

Contract set (private use) 21

| Phone number : yyyyyyyy |
| E-mail address : YYYYYYYY |
| Other service : Not available |
| Payer : Company |
| Payment method : Paid from company's bank account |

Contract set (business use) 22

CONTRACT SYSTEM AND COMMUNICATION METHOD FOR CELLULAR PHONE

FIELD OF THE INVENTION

The present invention relates to a contract system for a cellular phone. More particularly, the present invention relates to a contract system for a cellular phone in a cellular phone communication system according to which multiple phone numbers can be registered in a single cellular phone, and to a cellular phone communication method based on said communication system.

BACKGROUND OF THE INVENTION

Currently available services that enable multiple phone numbers to be used with a single cellular (portable) phone do not allow selection of a phone number upon making a call. Accordingly, not only the caller phone number displayed on a telephone of a receiver is always a fixed number but the multiple phone numbers cannot be used completely separately according to different receivers (for example, a user of the cellular phone may want to use phone number x for calling a bank while using phone number y for calling friends). Moreover, since the multiple phone numbers are managed collectively as a single contract set, the rate for phone calls cannot be charged separately for each phone number. Thus, in order to separate the use of phone numbers, multiple cellular phones are needed.

In order to solve this problem, Japanese Patent Laid-Open Application No. 2001-258074 describes a cellular phone which is capable of calling and receiving with multiple phone numbers in a radio communication system where the frequencies, the communication systems and the modulation systems are consistent. Hereinafter, this cellular phone is referred to as Cited Technique 1.

This cellular phone is provided with a control section including a baseband signal processor, a main controller, a mike, a speaker and a display manipulation unit, as well as single or multiple radio units (with identical frequencies, communication systems and modulation systems) each essentially consisting of an antenna, an antenna switch, a transmitter, a receiver and a frequency synthesizer.

Where multiple radio units are provided, one of the radio units is connected to the baseband signal processor of the control section by a radio unit switch. Where a single radio unit is provided, outgoing calls from the multiple phone numbers are switched by programmed control.

Thus, the user can separately use the phone numbers according to uses (for example, for business and private uses) and the rates can be charged separately according to the uses.

Although the description of Cited Technique 1 suggests a potential for "separate payments according to uses", there is no description as to how to correlate the payments of rates to uses.

Regarding rate charging, Japanese Patent Application No. 2001-188510 describes a business model where outgoing calls to a particular phone is charged to a payer who is different from the person who signed the contract for the cellular phone. Hereinafter, this technique is referred to as Cited Technique 2.

The charging system according to Cited Technique 2 distinguishes first and second payers to whom the rates will be charged according to the receivers of the outgoing calls.

Here, the person who signed the contract for the cellular phone is the first payer. Outgoing calls made to a particular receiver (which is registered beforehand by manipulation from the cellular phone) are charged to the second payer. The cellular phone connects to a rate information administration center via a base station and an intermediary station to register the phone number of the second payer who consented to the payment upon signing the contract as a receiver phone number to which the rate is charged. The rate information administration center stores the phone numbers input upon registration in rate information areas distinguished by receivers of the outgoing calls.

Thus, rates are automatically charged to the specified payers depending on the receivers of the outgoing calls.

Recently, due to marked development in the performance of information processor and size reduction of storage medium, cellular phones are installed with various functions to be used for multiple purposes. As a result, there are growing demands for a cellular phone which has a function that allows multiple phone numbers to be set to a single cellular phone as well as functions that allow different purposes to be assigned to the phone numbers and payers of the rates to be registered according to purposes, thereby conveniently making use of a single cellular phone according to different purposes.

Cited Technique 1 is developed for the former demand while Cited Technique 2 is developed for the latter demand. With these techniques, a cellular phone communication system can be established which realizes a cellular phone that can be used for different purposes and/or that automatically charges rates to the payers designated by the user of the cellular phone, without the need of purchasing or carrying multiple cellular phones.

As described above, similar to other electronic apparatuses, cellular phones are installed with various functions to provide various services. Existing services include, for example, e-mail service and Web browsing service.

At present, when a user of a cellular phone wants to receive these services, the user has to sign a contract including the payment method and the payer to be charged independently for each service. Accordingly, not only the contracts for the cellular phone but also the processes of the charging system for the switching network provider are complicated.

SUMMARY OF THE INVENTION

Thus, the present invention has an objective of providing a business model of a contract system for a cellular phone which can conveniently enjoy, as the user wishes, not only the existing e-mail and Web browsing services but other services that may be available in the future.

In order to achieve the above-described objective, a contract system for a cellular phone according to the present invention is based on the premise that it is a contract system for a cellular phone in a cellular phone communication system which allows multiple phone numbers to be registered in a single cellular phone.

Based on this premise, in the contract system of the invention: multiple contract sets, which are selectable by the user of the cellular phone and which each include a phone number, an available service, a payment method and a payer as contract clauses, are registered in the single cellular phone as contracts for the respective multiple phone numbers; and the cellular phone communication system manages communications for every contract sets according to the contract clauses defined in the respective contract sets and charges rates separately for the respective contract sets.

The cellular phone is always set to a contract set selected among the multiple contract sets, and for transmission, communication takes place according to the contract clauses defined in the currently selected contract set.

In the contract system of the invention: multiple contract sets having items corresponding to the contract clauses of the contract sets registered in the cellular phone are registered in a charging system of a switching network; when the switching network receives communication from the cellular phone, the switching network manages communication designated in the contract set relative to this communication; and the charging system calculates rates for the respective contract sets and charges the rates according to the payment methods and payers defined in the respective contract sets.

The cellular phone receives an incoming call corresponding to any of the contract sets registered in the cellular phone regardless of the currently selected contract set.

The available service comprise an e-mail service and a Web browsing service.

In the contract system of the invention, a melody call signal, an answerphone mode and an incoming call/an e-mail refusal mode may be selected for each of the contract sets registered in the cellular phone.

In addition, multiple contract sets made with different cellular phone communication system providers can be registered.

A communication method for a cellular phone of the invention is a communication method for a cellular phone in a cellular phone communication system which allows multiple phone numbers to be registered in a single cellular phone.

The communication method for a cellular phone according to the present invention comprises the steps of: registering multiple contract sets, which are selectable by the user and which each include a phone number, an available service, a payment method and a payer as contract clauses, in the single cellular phone as contracts for the respective multiple phone numbers; and registering multiple contract sets having items corresponding to the contract clauses of the contract sets in a charging system of a switching network, where the cellular phone transmits a message according to the clauses defined in the contract set selected by the user of the cellular phone, and upon receiving the message from the cellular phone, the switching network manages communication designated in the contract set relative to the communication, and the charging system calculates rates for the respective contract sets and charging the rates separately for the respective contracts sets according to the payment methods and the payers defined in the contract sets.

The cellular phone receives an incoming call corresponding to any of the contract sets registered in the cellular phone regardless of the currently selected contract set.

The user of the cellular phone may set contract sets for different purposes of the cellular phone.

DETAILED DESCRIPTION OF THE INVENTION

The present invention intends to allow multiple contracts to be made with a single cellular phone where one can select a set including a phone number, available services, a payer and a payment method for each contract.

According to the present invention, the person who signed for multiple contracts for a single cellular phone can easily select and switch among the uses based on the multiple contracts, and incoming calls or e-mails for every signed-up phone numbers and e-mail addresses can always be received.

The contract system for a cellular phone according to the present invention operates as follows:

(1) multiple contract sets each including a phone number, available services, a payment method and a payer are registered in a single cellular phone as contracts for respective phone numbers;

(2) any of the phone numbers and the e-mail addresses of the contract sets registered in the cellular phone can be selected as a caller phone number or a sender e-mail address upon making a call or sending an e-mail;

(3) incoming calls and e-mails can always be received for any phone numbers and e-mail addresses registered in the cellular phone; and (4) melody call signals, answerphone modes and incoming e-mail/incoming call refusal modes can be selected for every phone numbers and e-mail addresses registered in the cellular phone.

Figures 1, 2:
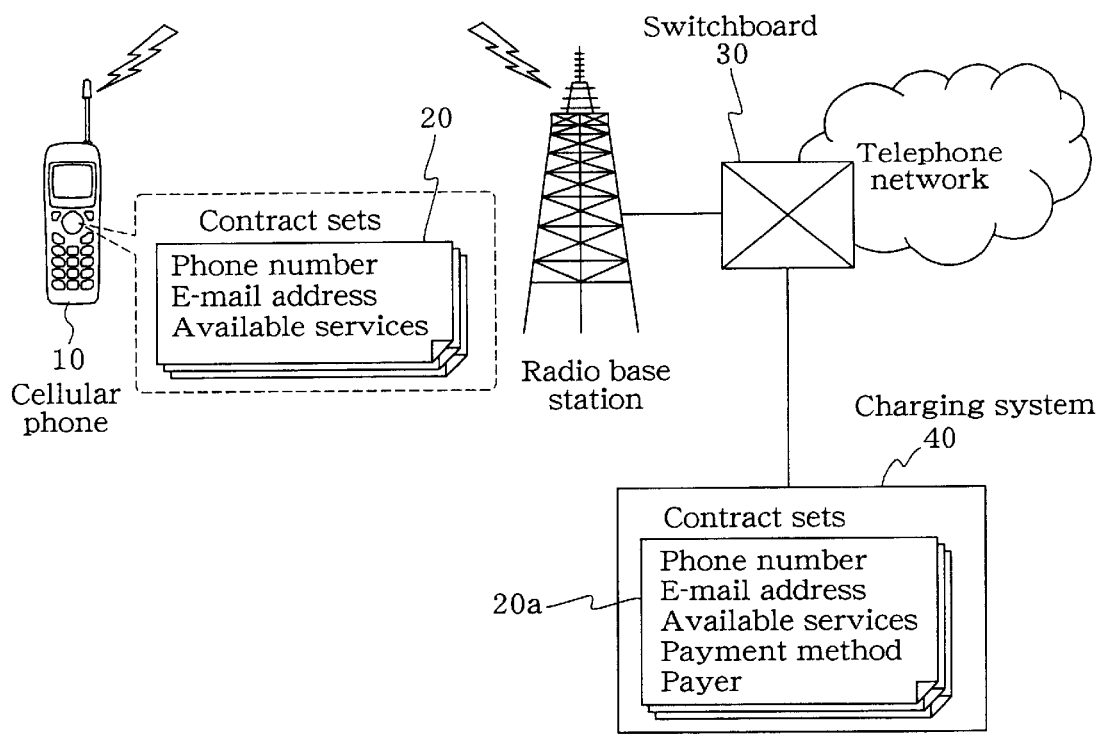
FIG. 1 is a schematic diagram showing a configuration of a contract system for a cellular phone for carrying out a contract method for a cellular phone according to the present invention.
FIG. 2 is a schematic diagram showing one example of contract sets including a contract set 21 for private use and a contract set 22 for business use which are signed by the same user.

FIG. 1 is a schematic diagram showing a configuration of a contract system for a cellular phone for carrying out a contract method for a cellular phone according to the present invention.

The contract system according to the present embodiment is provided with a cellular phone 10 having multiple phone numbers, in which multiple contract sets 20 corresponding to the respective multiple phone numbers are registered, a switchboard 30, a telephone network 31 and a charging system 40 in which contract sets 20*a* corresponding to the contract sets 20 are registered.

The cellular phone 10 has a function of registering multiple contract sets 20 therein. Each of the contract sets 20 contains as the contract clauses a phone number (essential), various services that are available such as an e-mail service (optional), a payer and a payment method.

Once the multiple contract sets 20 are registered in the cellular phone 10, the cellular phone 10 has multiple phone numbers and e-mail addresses by itself.

The cellular phone 10 has a function for the user of the cellular phone 10 to easily switch the operation among the contract sets 20. Therefore, when this cellular phone 10 is used to make a call or send an e-mail, the phone number or the e-mail address corresponding to the currently selected contract set 20 is used as the caller or sender data.

Regardless of the currently selected contract set 20, incoming calls and e-mails phones can be received with any one of the phone numbers and e-mail addresses which are registered beforehand in the cellular phone 10 of the present embodiment. Furthermore, the cellular phone 10 according to the present embodiment has a function of setting a melody call signal for each of the phone numbers for phone calls and e-mails registered in the cellular phone 10, a function of setting the answerphone mode for each of the phone numbers for phone calls of the cellular phone 10, and a function of setting the incoming e-mail/call refusal mode.

The contract sets 20a including items corresponding to the contract clauses of the contract sets 20 registered in the cellular phone 10 are registered in the charging system 40. The charging system 40 has a function of calculating rates for the respective contract sets 20a and charging the rates according to the payment method and the payer corresponding to each of the contract sets 20a.

Hereinafter, operations of the present embodiment will be described with reference to FIGS. 2 to 4.

FIG. 2 is a schematic diagram showing one example of the contract sets 20 (FIG. 1) including a contract set 21 for private use and a contract set 22 for business use which are signed by the same user of the cellular phone. The contract set 21 for private use contains a phone number for phone calls, a phone number (e-mail address) for receiving emails and data for receiving Web browsing service, as well as data that the payer is an individual and that the bill is paid from the individual's bank account.

The contract set 22 for business use is a contract made between a telephone company and a company to which the individual belongs, which contains a phone number for phone calls and a phone number (e-mail address) for receiving emails, as well as data that the payer for the calls using the phone number of the contract set 22 is the company and that the bill is paid from the company's bank account.

Figure 3:
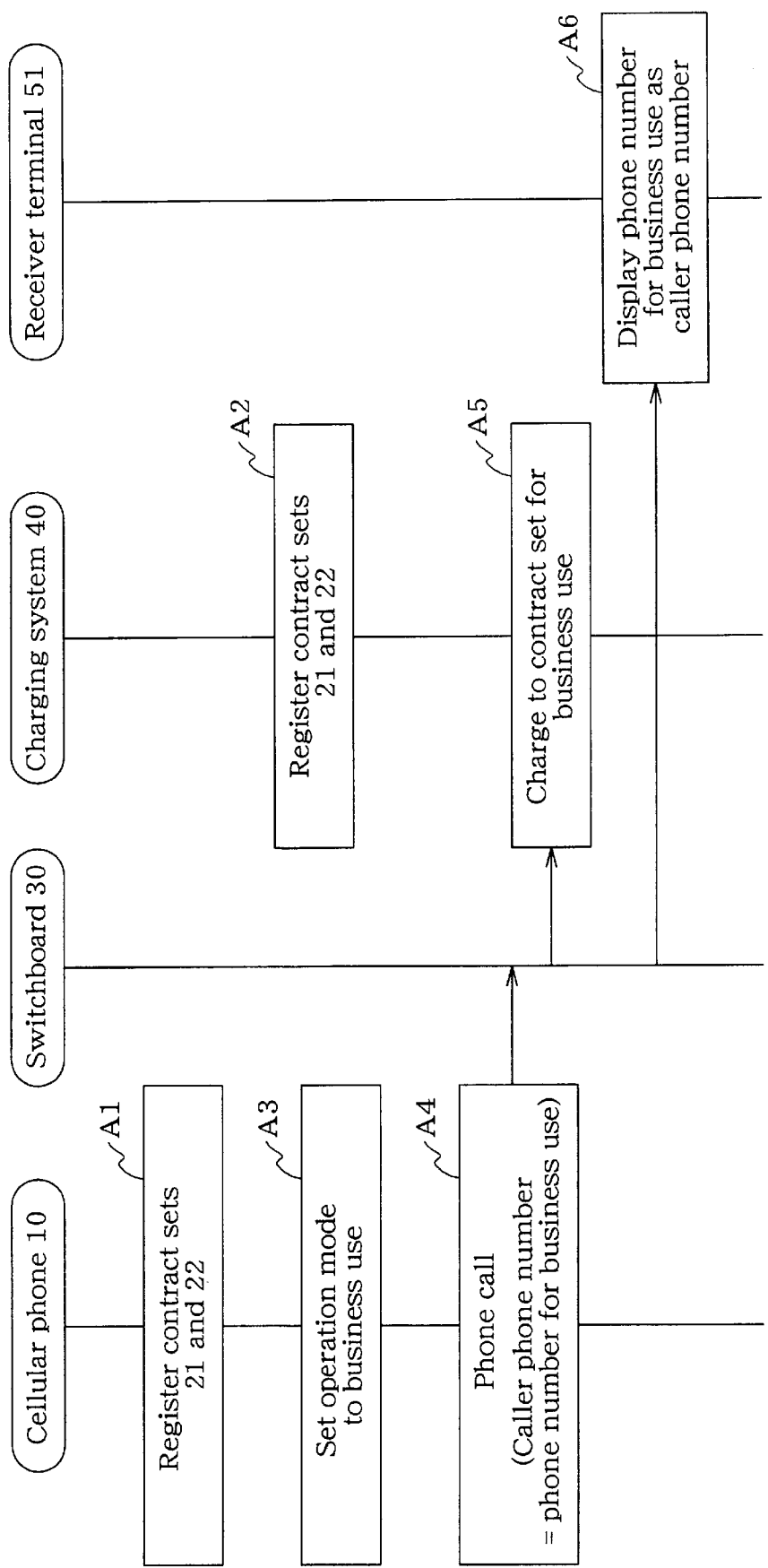
FIG. 3 is a flowchart showing an exemplary operation upon using the contract set for business use in the contract system for the cellular phone.

FIG. 3 is a flowchart showing an exemplary operation upon using the contract set for business use in the contract system of the present embodiment.

First, the contract set 21 for private use and the contract set 22 for business use are registered in the cellular phone upon signing contracts with the telephone company (Step A1). Data identical to the contents of the contract sets 21 and 22 registered in the cellular phone 10 is also registered in the charging system 40 (Step A2). The user of the cellular phone 10 sets the cellular phone 10 to operate according to the contract set 22 for business use during work (Step A3). When a call is made from the cellular phone 10 in this state (Step A4), the caller phone number is sent from the cellular phone 10 to the charging system 40 via the switchboard 30 so that a rate for this call is charged to the contract set 22 for business use (Step A5). Among the phone numbers registered in the cellular phone 10, the phone number for business use is displayed as a caller phone number on a telephone 51 of a receiver (Step A6).

Figure 4:
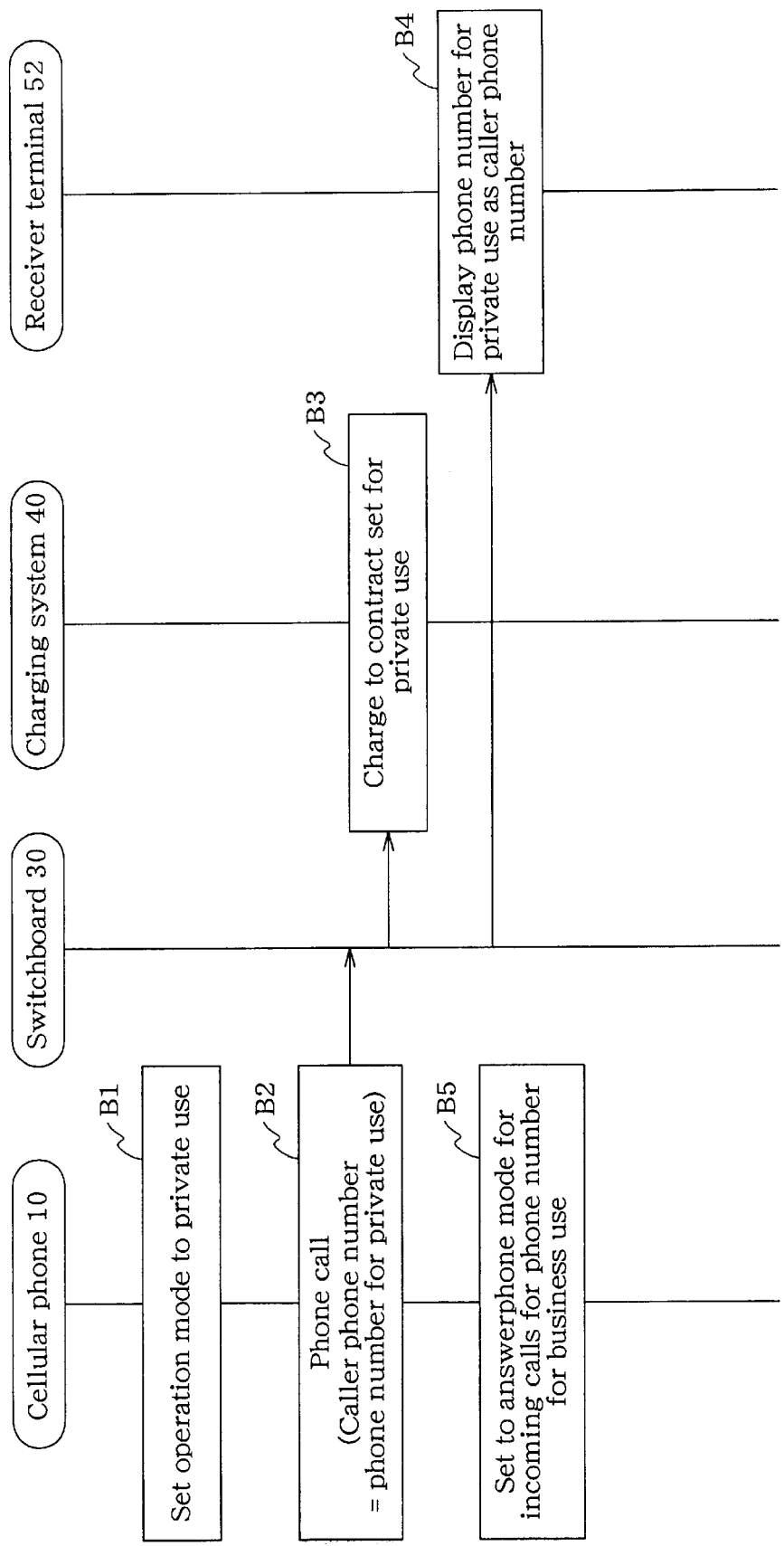
FIG. 4 is a flowchart showing an exemplary operation upon using the contract set for private use in the contract system for the cellular phone.

FIG. 4 is a flowchart showing an exemplary operation upon using the contract set for private use in the contract system according to the present embodiment. The user of the cellular phone sets the cellular phone 10 to operate according to the contract set 21 for private use during private time (e.g., on holidays) (Step B1). When a call is made from the cellular phone 10 in this state (Step B2), the caller phone number for private use is sent to the charging system 40 via the switchboard 30 so that a rate for this call is charged to the contract set 21 for private use (Step B3). This phone number for private use is displayed as a caller phone number on a telephone 52 of a receiver (Step B4). Incoming calls can be received with the phone number for business use even when the cellular phone 10 is set to the contract set 21 for private use. The user may set to the answerphone mode so that incoming calls for the phone number for business use from other telephone is diverted to the answerphone (Step B5).

When the user of the cellular phone 10 sets the cellular phone 10 to operate according to the contract set 22 for business use, the cellular phone recognizes that the contract set 22 for business use does not include Web browsing service and refuses Web browsing by the user while the contract set 22 for business use is selected. When the user switches from the contract set 22 for business use to the contract set 21 for private use, the cellular phone 10 recognizes that the contract set 21 for private use has the right for Web browsing and thus allows the user to browse a Web site. The rate in this case is charged to the contract set 21 for private use.

According to the present embodiment, multiple contract sets for made with the same telephone company are registered in a single cellular phone. However, multiple contract sets made with different telephone companies (e.g., one contract set may be made with telephone company X while another contract set may be made with telephone company Y) may also be registered in a cellular phone.

Thus, the above-described contract system for a cellular phone has the following advantages.

(1) There is no need of purchasing or carrying multiple cellular phones when a single user desires to use multiple cellular phones for multiple uses.

(2) The payment methods and the payers can be separated for respective contracts so that rate calculation and charging can be made according to uses. For example, a rate for business use may be paid by a company while a rate for private use may be paid by an individual.

(3) Multiple phone numbers and e-mail addresses can be registered in a single cellular phone. Therefore, the user can select a phone number or an e-mail address upon making a call or sending an e-mail, thereby selecting a suitable caller phone number or sender e-mail address according to the receiver. In addition, incoming calls or emails can always be received with any of the registered phone numbers or e-mail addresses.

What is to be claimed:

1. A contract system for a cellular phone in a cellular phone communication system which allows multiple phone numbers to be registered in a single cellular phone,
wherein multiple contract sets, which are selectable by the user of the cellular phone and which each include a phone number, an available service, a payment method and a payer as contract clauses, are registered in the single cellular phone as contracts for the respective multiple phone numbers; and
wherein the cellular phone communication system manages communications for every contract sets according to the contract clauses defined in the respective contract sets and charges rates separately for the respective contract sets.

2. A contract system according to claim 1, wherein the cellular phone is always set to a contract set selected among the multiple contract sets, and for transmission, communication using the cellular phone takes place according to the contract clauses defined in the currently selected contract set.

3. A contract system according to claim 2, wherein:
multiple contract sets having items corresponding to the contract clauses of the contract sets registered in the cellular phone are registered in a charging system of a switching network;
when the switching network receives communication from the cellular phone, the switching network manages communication designated in the contract set relative to this communication; and the charging system calculates rates for the respective contract sets and charges the rates according to the payment methods and payers defined in the respective contract sets.

4. A contract system according to claim 2, wherein the cellular phone receives an incoming call corresponding to any of the contract sets registered in the cellular phone regardless of the currently selected contract set.

5. A contract system according to claim 3, wherein the available service comprise an e-mail service and a Web browsing service.

6. A contract system according to claim 4, wherein a melody call signal, an answerphone mode and an incoming call/an e-mail refusal mode can be selected for each of the contract sets registered in the cellular phone.

7. A contract system according to claim 3, wherein multiple contract sets made with different cellular phone communication system providers are registered.

8. A communication method for a cellular phone in a cellular phone communication system which allows multiple phone numbers to be registered in a single cellular phone, the method comprising the steps of:

registering multiple contract sets, which are selectable by the user and which each include a phone number, an available service, a payment method and a payer as contract clauses, in the single cellular phone as contracts for the respective multiple phone numbers; and registering multiple contract sets having items corresponding to the contract clauses of the contract sets in a charging system of a switching network, wherein the cellular phone transmits a message according to the contract clauses defined in the contract set selected by the user of the cellular phone, and upon receiving the message from the cellular phone, the switching network manages communication designated in the contract set relative to the communication, and the charging system calculates rates for the respective contract sets and charging the rates separately for the respective contracts sets according to the payment methods and the payers defined in the contract sets.

9. A communication method according to claim 8, wherein the cellular phone receives an incoming call corresponding to any of the contract sets registered in the cellular phone regardless of the currently selected contract set.

10. A communication method for a cellular phone according to claim 8, wherein the user of the cellular phone sets contract sets for different purposes of the cellular phone.

\* \* \* \* \*